(12) United States Patent
Ertel et al.

(10) Patent No.: US 8,555,929 B2
(45) Date of Patent: Oct. 15, 2013

(54) MULTI-HOLE INSULATION TUBE

(75) Inventors: Greg Ertel, Clinton, TN (US);
Sireeporn Khotchapunsoontorn, Sweetwater, TN (US); Ketwan Ramseur, Powell, TN (US); Darrell Peil, Rock Hill, SC (US); Pawat Vitoorapakorn, Sweetwater, TN (US)

(73) Assignee: Aeroflex USA, Sweetwater, TN (US)

( * ) Notice: Subject to any disclaimer, the term of this patent is extended or adjusted under 35 U.S.C. 154(b) by 0 days.

(21) Appl. No.: 13/305,359

(22) Filed: Nov. 28, 2011

(65) Prior Publication Data
US 2013/0133773 A1 May 30, 2013

(51) Int. Cl.
*F16L 55/00* (2006.01)

(52) U.S. Cl.
USPC ............ 138/108; 138/110; 138/113; 138/116; 138/149

(58) Field of Classification Search
USPC ............ 138/108, 110, 106, 44, 113, 116, 149
See application file for complete search history.

(56) References Cited

U.S. PATENT DOCUMENTS

| | | | |
|---|---|---|---|
| 3,250,297 A * | 5/1966 | Mooneyham | 138/113 |
| 3,269,422 A * | 8/1966 | Matthews et al. | 138/111 |
| 4,194,536 A * | 3/1980 | Stine et al. | 138/149 |
| 4,399,319 A * | 8/1983 | Zinn | 174/47 |
| 4,575,184 A | 3/1986 | Ueno et al. | |
| 4,653,541 A | 3/1987 | Oehlschlaeger et al. | |
| 5,187,009 A | 2/1993 | Kimura et al. | |
| 5,400,602 A | 3/1995 | Chang et al. | |
| 5,569,513 A | 10/1996 | Fidler et al. | |
| 5,626,167 A | 5/1997 | Streit | |
| 5,725,028 A | 3/1998 | Cleland | |
| 5,996,643 A | 12/1999 | Stonitsch | |
| 6,003,559 A * | 12/1999 | Baker | 138/108 |
| 6,062,267 A * | 5/2000 | Fleming | 138/114 |
| 6,094,922 A | 8/2000 | Ziegler | |
| 6,213,157 B1 * | 4/2001 | Thiebaud et al. | 138/149 |
| 6,463,199 B1 | 10/2002 | Quinn et al. | |
| 6,719,018 B2 | 4/2004 | Colombo et al. | |
| 6,922,512 B2 | 7/2005 | Nechitailo | |
| 7,597,120 B2 | 10/2009 | Beckett | |
| 7,635,008 B2 | 12/2009 | Follett et al. | |
| 7,643,713 B2 | 1/2010 | Buthe et al. | |
| 7,650,911 B2 * | 1/2010 | Follett et al. | 138/108 |
| 7,786,385 B2 | 8/2010 | Hirose et al. | |
| 7,840,244 B2 | 11/2010 | Hirose et al. | |
| 7,975,727 B2 * | 7/2011 | Adler et al. | 138/114 |

* cited by examiner

Primary Examiner — Patrick F Brinson
(74) Attorney, Agent, or Firm — Pitts & Lake, P.C.

(57) ABSTRACT

A multi-hole insulation tube with multiple interior insulation channels to accommodate multiple conduits of unequal temperatures is disclosed. Each channel within the tube is insulated from the other channels so as to substantially prevent the negative influence of one conduit on another through conduction.

3 Claims, 5 Drawing Sheets

MULTI-HOLE INSULATION TUBE

CROSS-REFERENCE TO RELATED APPLICATIONS

Not Applicable.

STATEMENT REGARDING FEDERALLY-SPONSORED RESEARCH OR DEVELOPMENT

Not Applicable.

BACKGROUND OF THE INVENTION

1. Field of Invention

The present general inventive concept relates generally to an insulation tube, and more particularly to a multi-hole insulation tube with multiple interior insulation channels to accommodate multiple conduits of unequal temperatures. Each channel within the tube is insulated from the other channels so as to substantially prevent the negative influence of one conduit on another through conduction.

2. Description of the Related Art

The insulation of conduits or piping has long been known in the art. Further, the prior art also discloses grouping multiple conduits together and the insulation thereof. For instance, U.S. Pat. No. 5,725,028 teaches a trunk line comprising a plurality of elongated flow lines in parallel juxtaposition, all housed in a single thermal insulation member. U.S. Pat. No. 5,400,602 teaches a foam-insulated hose designed to accommodate both a supply and return conduit filled with cryogenic fluid.

One problem with the above-mentioned prior art is that they cannot accommodate multiple conduits of unequal temperatures. When separate conduits or flow lines of unequal temperatures are in contact with one another, energy is transferred between them through conduction. Conduction causes each conduit or flow line to negatively influence the other. Thus, a system having a hot line and a cold line could not be housed in the same insulation envelope without energy being transferred between them.

In an effort to separate conduits housed in the same insulation envelope, U.S. Pat. No. 6,719,018 B2 discloses a beverage chase system where distribution lines are bundled together and enclosed in a foam tubular member. Multiple bundles are then grouped together in a parallel juxtaposition and encapsulated in a single insulated housing. Similarly, U.S. Pat. No. 4,653,541 teaches a tube assembly for accommodating one or more conduits, each having a steel inner tube inside a steel outer tube and a plastic jacket enclosing the outer tubes. Going even further, U.S. Pat. No. 4,194,536 discloses composite tubing with one or more conveyance lines and one or more heating lines. One embodiment with multiple conveyance lines also includes a separation member that encompasses a single conveyance line and thermally separates said line from another line housed in the same composite tube.

In all the prior art disclosures with multiple conduits encompassed in a single insulation envelope, multiple conduits are either in direct contact with one another or are separated by an additional component meant to either insulate one or more conduits from another conduit or group thereof, or bundle a group of conduits together. What the prior art does not provide is a single insulation tube that has two or more insulation channels to accommodate and insulate two or more conduits of unequal temperatures without additional structural components.

BRIEF SUMMARY OF THE INVENTION

The present general inventive concept, in some of its various embodiments, fills the above-mentioned void by providing a single insulation tube containing multiple insulation channels. The multiple insulation channels can accommodate multiple conduits of unequal temperature in a single insulation tube and prevent the temperature transfer from one conduit to another through conduction.

One embodiment of the multi-hole insulation tube is generally comprised of an elongated tubular member having two ends and made of flexible insulation material. The tube has an exterior surface and two or more defined interior insulation channels that extend between both ends. Each interior insulation channel is designed to receive a conduit that will extend through said insulation channel and through said tube. The insulation channels can be of the same diameter to accommodate multiple conduits of the same size. Alternatively, the insulation channels can vary in diameter to accommodate different sized conduits.

Importantly, each insulation channel is self-contained within the tube and separated from the other insulation channels by the insulation material itself. This is to facilitate the housing of multiple conduits with unequal temperature flows which is particularly useful in air conditioning and refrigeration equipment. Frequently in residential and commercial air conditioning systems, multiple conduits or flow lines are simultaneously run between the same two termination points for recirculation. One is often for dispensing a relatively cooler flow to a termination point, and the other is often for returning a relatively warmer flow to the opposite termination point. In the past, each of these lines would require its own insulation tube because a single insulation housing would cause one line to negatively influence the other through conduction. The present invention permits both flow lines to be housed in a single insulation tube, thus saving space and reducing installation time.

BRIEF DESCRIPTION OF THE DRAWINGS

The above-mentioned and additional features of the present general inventive concept will become more clearly understood from the following detailed description of the invention read together with the drawings in which.

DETAILED DESCRIPTION OF THE INVENTION

The present general inventive concept, in some of its embodiments, includes generally an insulation tube made of flexible insulation foam material and having multiple insulation channels to accommodate multiple conduits. In one embodiment of the present invention, the insulation tube is made of an ethylene propylene diene monomer ("EPDM") base elastomeric composition, however one skilled in the art of insulation materials will recognize that other elastomeric foam compositions can be used without departing from the spirit or scope of applicant's general inventive concept. For instance, suitable flexible insulation materials include, but are not limited to, thermoplastic polymers such as polyethylene (PE), polypropylene (PP), polymethylpentene (PMP), polybutene-1 (PB-1) polyethylene terephthalate (PET), and polyurethane (PU) as well as other polyolefin elastomers (POE) such as polyisobutylene (PIB) and ethylene propylene rubber (EPR). Additionally, other elastomeric foam materials, including but not limited to, nitrile (NBR), styrene-butadiene (SBR), polybutadiene (BR), natural rubber (NR), chloroprene (CR), butyl and halobutyl (IIR, BIIR, CIIR), silicone (MQ), blends with compatible rubbers, e.g. styrene-butadiene and polybutadiene, blends with compatible resins, e.g., nitrile and polyvinyl chloride can also be used.

Figure 1:
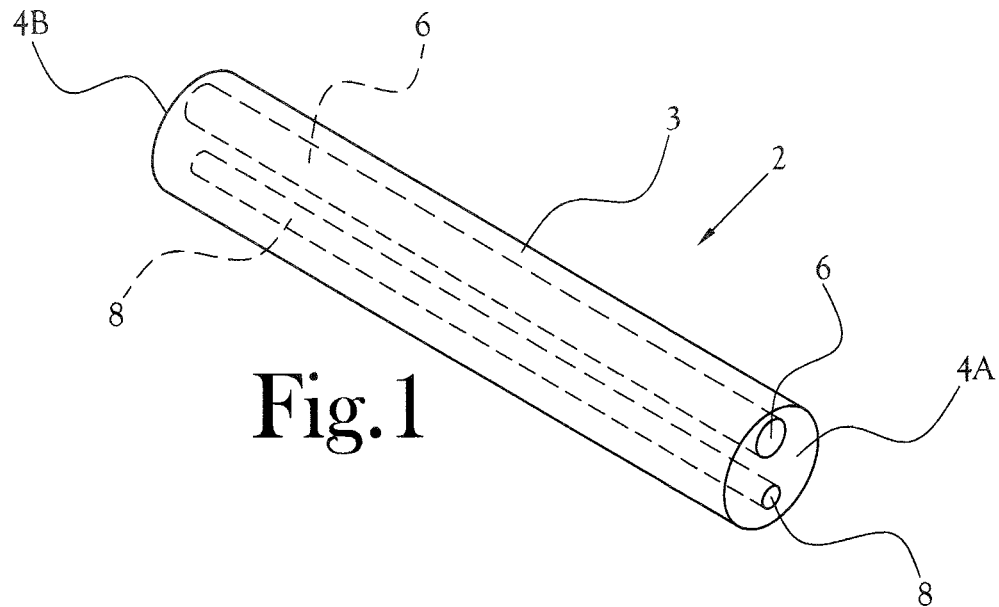
FIG. 1 illustrates a perspective view of one embodiment of the present general inventive concept containing two insulation channels with unequal diameters.
Figure 2:
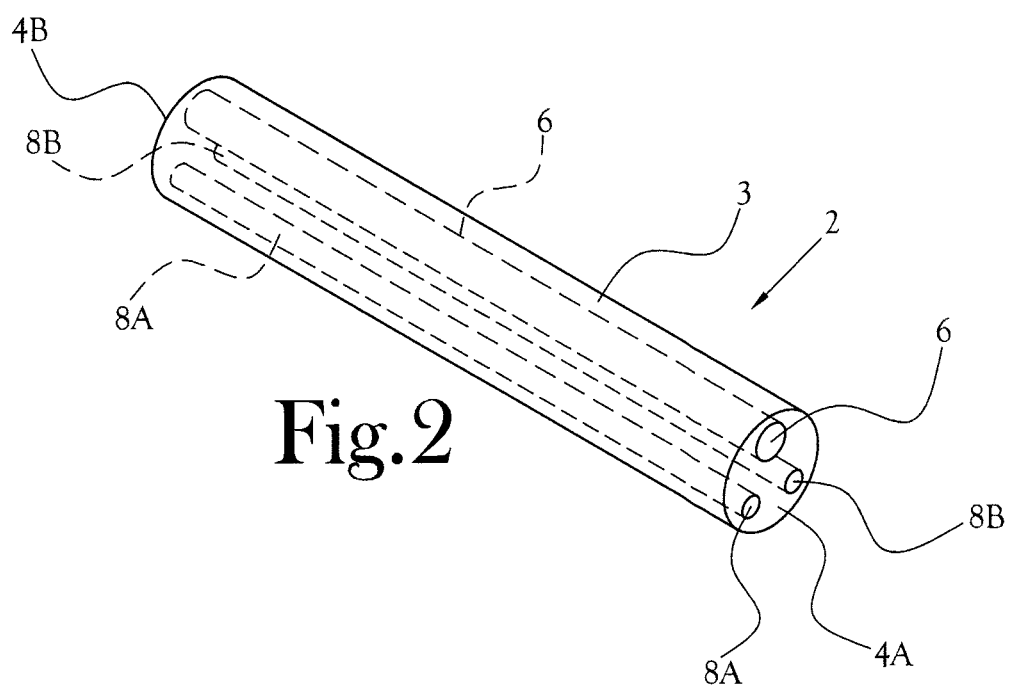
FIG. 2 illustrates a perspective view of one embodiment of the present general inventive concept containing three insulation channels, two of which having equal diameters and the third having a larger diameter.

Referring to FIGS. 1 and 2, the present inventive concept is generally comprised of an elongated tubular insulation member 2 having two ends 4A, 4B. Exposed on either end 4A, 4B, and spanning the length of the elongated tubular insulation member 2, are defined interior insulation channels 6, 8. The insulation channels 6, 8 are defined by the flexible insulation material 3 and are expandable to accommodate a conduit therethrough in a manner that produces a surface contact relationship between the defined insulation channel 6, 8 and the exterior of the conduit.

In FIG. 1, the embodiment contains two insulation channels 6, 8. Both insulation channels 6, 8 are cylindrical in the illustrated embodiment and have unequal diameters. Contrastingly, FIG. 2 shows an embodiment with three interior insulation channels 6, 8A, 8B, also all cylindrical. Insulation channels 8A and 8B have equal diameters, whereas insulation channel 6 has a larger diameter relative to channels 8A and 8B. Stated differently, the insulation channels 6, 8 contained in a single tubular insulation member 2 can be of equal or unequal diameters. Further, it is important to note that one of skill in the art will readily recognize that the cylindrical nature of the insulation channels are not essential to the present general inventive concept and can be deviated therefrom without departing from the scope and spirit of the present general inventive concept.

Figure 3A:
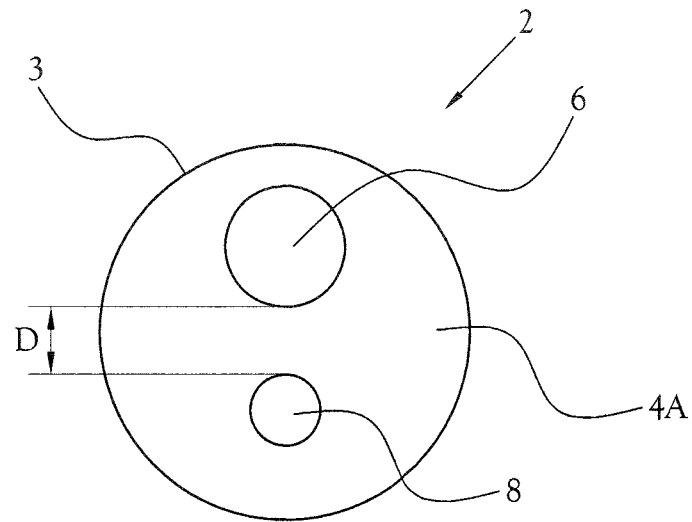
FIGS. 3A-3B illustrate a front view of one end of the present general inventive concept containing two insulation channels.
Figure 3B:
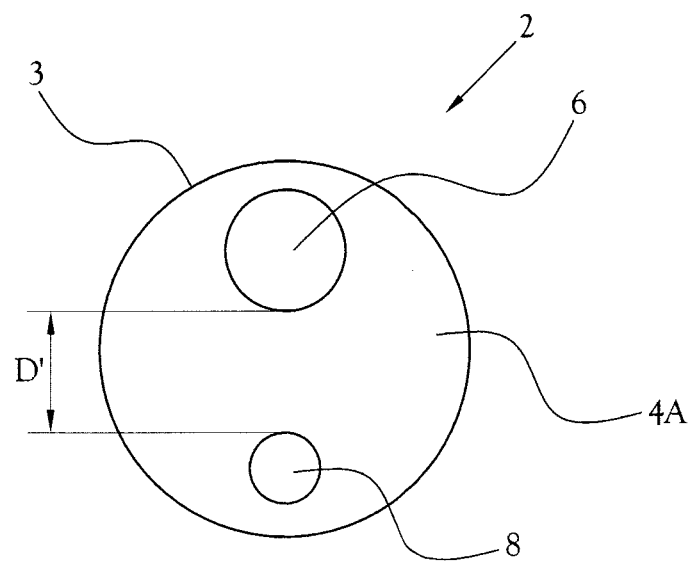

FIGS. 3A-3B illustrate an end 4A of the elongated tubular insulation member 2. The insulation channels 6, 8 are separated in both illustrations by the flexible insulation material 3. The distance of separation between the insulation channels 6, 8 is indicated by D in FIGS. 3A and D' in FIG. 3B. The distance is selected according to the insulation material 3 used and the insulation requirements of the accommodated conduits. For instance, if the heat difference between the accommodated conduits is great, then a greater thermal resistance value ("R-value") must be achieved by the insulation material 3 separating them in order to properly insulate said conduits from one another so as to minimize or substantially prevent heat transfer through conduction. To achieve a greater R-value, a greater distance D' is selected to separate the interior insulation channels 6, 8, as shown in FIG. 3B.

Figure 4:
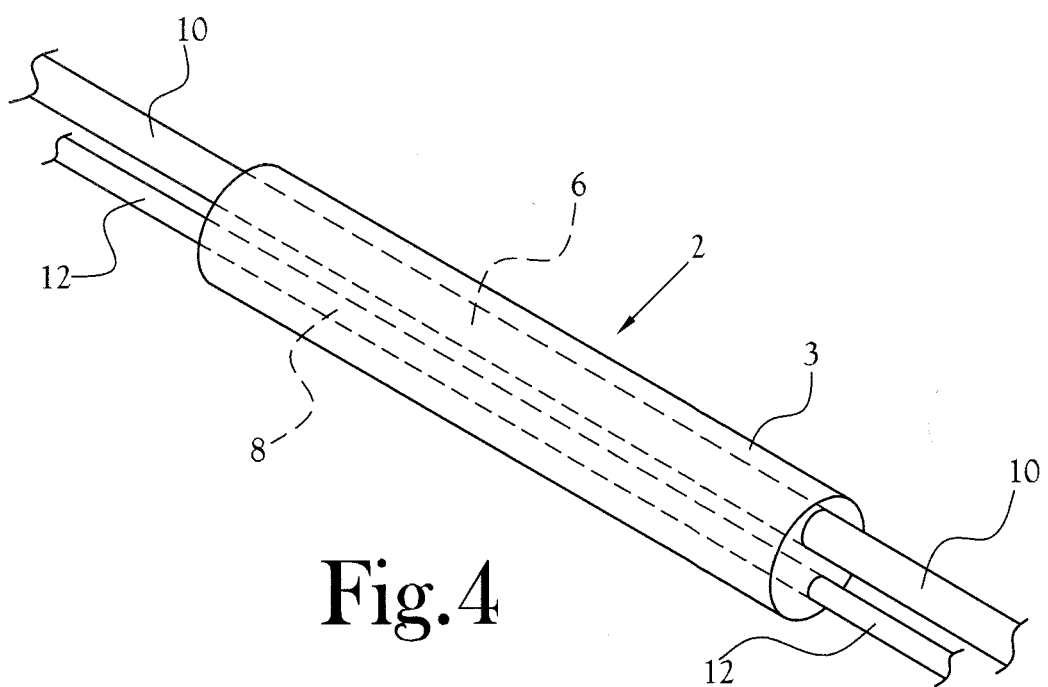
FIG. 4 illustrates a perspective view of one embodiment of the present general inventive concept containing two insulation channels each accommodating a conduit.

In FIG. 4, the insulation channels 6, 8 are each accommodating a conduit 10, 12. Conduit 10 has a larger diameter than conduit 12, and therefore the larger insulation channel 6 accommodates conduit 10, whereas the smaller insulation channel 8 accommodates conduit 12. The conduits 10, 12 are separated from one another by a selective distance D (see FIGS. 3A-3B) comprised of insulation material 3. Distance D is selected according to the heat differences between the conduits 10, 12 and thermal properties of the insulation material 3. Thus, if conduits 10 and 12 each contained liquid or gas flows of different temperatures, both would be insulated from one another while also being housed in the same insulation tube.

Figure 5:
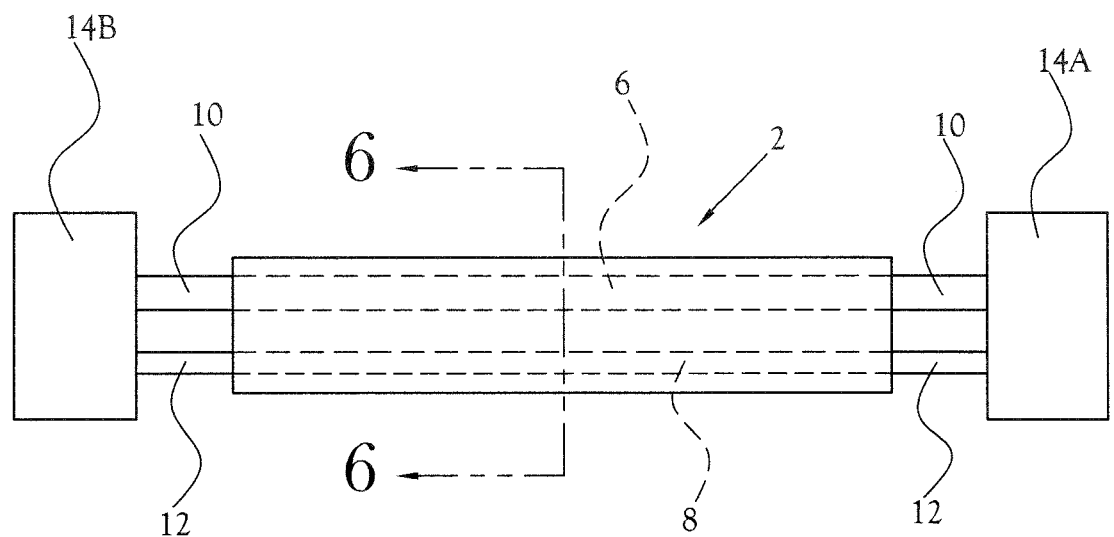
FIG. 5 illustrates a side view of one embodiment of the present general inventive concept containing two insulation channels each accommodating a conduit connected to a termination point at both ends.

FIG. 5 portrays the assembly shown in FIG. 4 with the conduits 10, 12 being attached to two termination points 14A, 14B. For instance, the termination points 14A and 14B could be part of a refrigeration system where conduit 10 is a distribution line whose contents flow from one termination point 14A to the other termination point 14B, and conduit 12 is a return line whose contents flow from termination point 14B to termination point 14A. In the event that the distribution and return flows are of unequal temperatures, the present invention allows both conduits 10, 12 to be housed together while still insulating each of them from the other.

Figure 6:
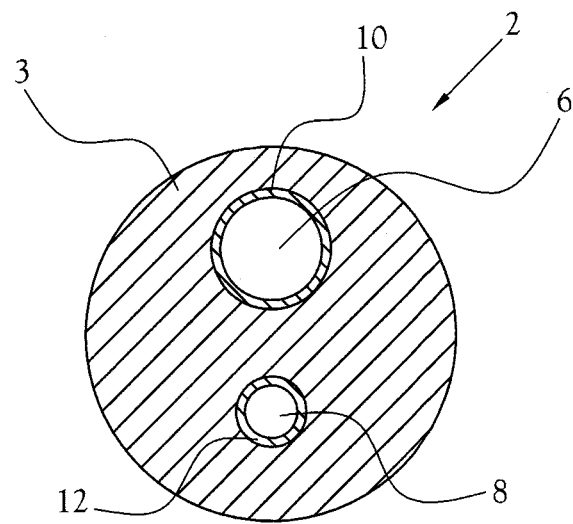
FIG. 6 illustrates a cross-sectional view of the inventive embodiment illustrated in FIG. 5.

The cross-sectional view of FIG. 6 shows how each conduit 10, 12 is insulated from the other by the insulation material 3 that comprises the elongated tubular insulation member 2. The present illustration shows a circular cross section. However, one of skill in the art will recognize that the circular shape is not essential for the present invention. The cross-sectional shape can also be, without limitation, rectangular, ovular, or triangular.

Figure 7A:
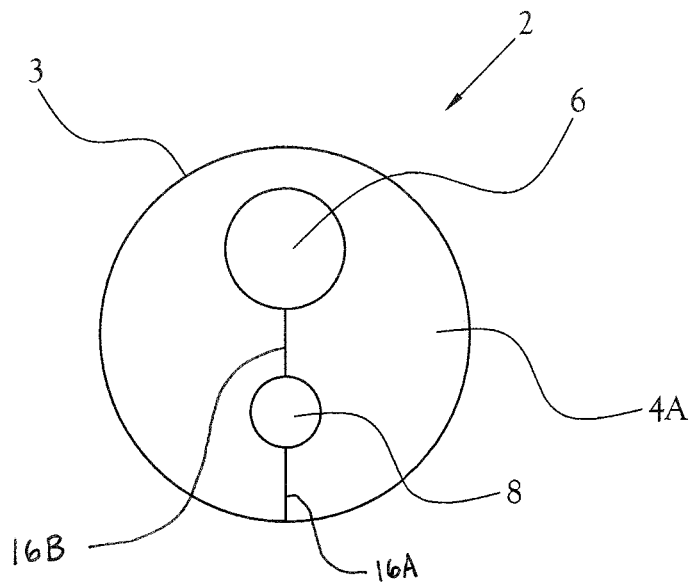
FIGS. 7A-7B illustrate front views of two embodiments of the present general inventive concept where the insulation tube can be opened longitudinally to access each insulation channel.
Figure 7B:
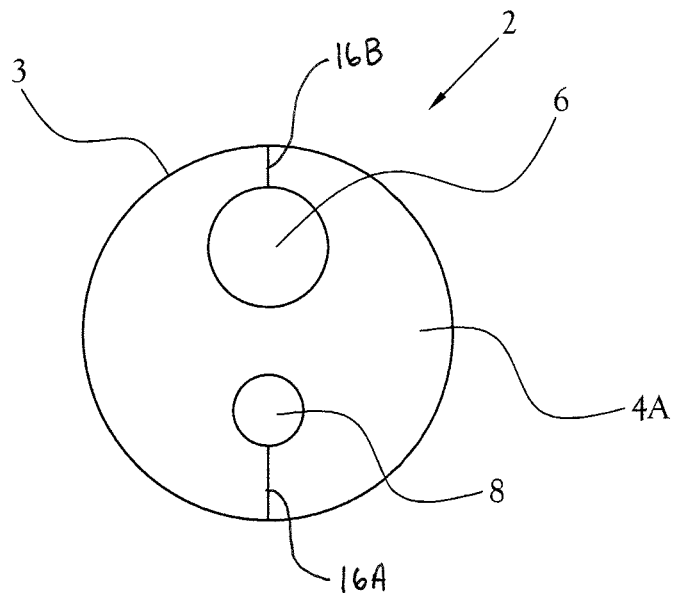

In FIG. 7A-B, two additional embodiments are shown that allow the elongated tubular insulation member 2 to be opened longitudinally to access each insulation channel 6, 8. In the previously illustrated embodiments, each conduit 10, 12 is installed by inserting one end of the conduit 10, 12 into an insulation channel 6, 8 at one end 4A of the elongated tubular insulation member 2 and running the length of the conduit 10, 12 through the insulation channel 6, 8 until the inserted end exits out the insulation channel 6, 8 on the opposite end 4B of the tubular insulation member 2 and the desired position of the tubular insulation member 2 relative to the conduit 10, 12 is achieved. Turning to the presently illustrated embodiments in FIG. 7A-B, installation of the conduits 10, 12 into each insulation channel 6, 8 can be achieved by opening the longitudinal separations 16A, 16B so as to access the spanning interior of each insulation channel 6, 8. Each longitudinal separation 16A, 16B spans the length of the tubular insulation member 2 each included interior insulation channel 6, 8. Conduits 10, 12 are laid in their respective insulation channels and the tubular insulation member 2 is then closed by rejoining both sides of the longitudinal separations 16A and 16B.

The difference between the illustrated embodiments of FIGS. 7A and 7B is that in the FIG. 7A embodiment, insulation channel 6 cannot be accessed without also opening and accessing insulation channel 8. This is the result of longitudinal separation 16B being positioned between insulation channels 6 and 8. Contrastingly, the embodiment in FIG. 7B has both longitudinal separations 16A, 16B extending from insulation channels 8 and 6, respectively, to the exterior of the elongated tubular insulation member 2. This results in the independent accessibility of each insulation channel 6, 8.

While the present general inventive concept has been illustrated by description of some embodiments, and while the illustrative embodiments have been described in detail, it is not the intention of the applicant to restrict or in any way limit the scope of the appended claims to such detail. Additional modifications will readily appear to those skilled in the art. The invention in its broader aspects is therefore not limited to the specific details, representative apparatus and methods, and illustrative examples shown and described. Accordingly, departures may be made from such details without departing from the spirit or scope of applicant's general inventive concept.

What is claimed is:

1. An insulation tube comprising:
    an elongated tubular insulation member having two ends and being comprised of flexible insulation material, said insulation member having at least two defined interior insulation channels extending between said two ends, said insulation channels being expandable so as to each accommodate a conduit therethrough;
    whereby said at least two insulation channels are separated by insulation material, said separation being a selected distance to insulate conduits having unequal temperature flows so as to substantially prevent conduction therebetween;
    wherein the spanning interior of each said defined interior insulation channel is accessible via longitudinal separations;
    wherein at least one longitudinal separation is positioned between insulation channels,
    wherein at least one insulation channel cannot be accessed without also opening and accessing a second insulation channel.

2. An insulation tube comprising:
    an elongated tubular insulation member having two ends and being comprised of flexible insulation material, said insulation member having at least two defined interior insulation channels extending between said two ends, said insulation channels being expandable so as to each accommodate a conduit therethrough;
    whereby said at least two insulation channels are separated by insulation material, said separation being a selected distance to insulate conduits having unequal temperature flows so as to substantially prevent conduction therebetween, wherein said at least two defined interior insulation channels have unequal diameters;
    wherein the spanning interior of each said defined interior insulation channel is accessible via longitudinal separations and wherein at least one longitudinal separation is positioned between insulation channels,
    wherein at least one insulation channel cannot be accessed without also opening and accessing a second insulation channel.

3. An insulated conduit assembly comprising:
    a plurality of conduits disposed in parallel juxtaposition relative to one another, said plurality of conduits being insulated by a single insulation tube, said insulation tube comprising a tubular insulation member with two opposing ends and made of flexible insulation material, said tubular insulation member including at least two defined interior insulation channels extending between said at least two opposing ends, each said defined interior insulation channel accommodating a single conduit therethrough, said defined interior insulation channels being separated by insulation material, said separation being a selected distance to insulate conduits having unequal temperature flows so as to substantially prevent heat transfer therebetween through conduction; wherein said at least two defined interior insulation channels have unequal diameters;
    wherein the spanning interior of each said interior insulation channel is accessible via longitudinal separations,
    wherein at least one longitudinal separation is positioned between insulation channels,
    wherein at least one insulation channel cannot be accessed without also opening and accessing a second insulation channel.

* * * * *